(No Model.)

A. J. BEATON.
FLOOR AND CEILING PLATE FOR STEAM PIPES.

No. 453,461. Patented June 2, 1891.

Witnesses.
John Edwards Jr.
W. H. Whiting.

Inventor.
Allan J. Beaton.
By James Shepard.
Atty.

UNITED STATES PATENT OFFICE.

ALLAN J. BEATON, OF NEW BRITAIN, CONNECTICUT.

FLOOR AND CEILING PLATE FOR STEAM-PIPES.

SPECIFICATION forming part of Letters Patent No. 453,461, dated June 2, 1891.

Application filed March 19, 1890. Serial No. 344,566. (No model.)

*To all whom it may concern:*

Be it known that I, ALLAN J. BEATON, a citizen of the United States, residing at New Britain, in the county of Hartford and State of Connecticut, have invented certain new and useful Improvements in Floor and Ceiling Plates for Steam-Pipes, of which the following is a specification.

My invention relates to improvements in floor and ceiling plates for steam-pipes; and the objects of my improvement are simplicity and cheapness of construction and general convenience and utility of the article.

Figure 1:
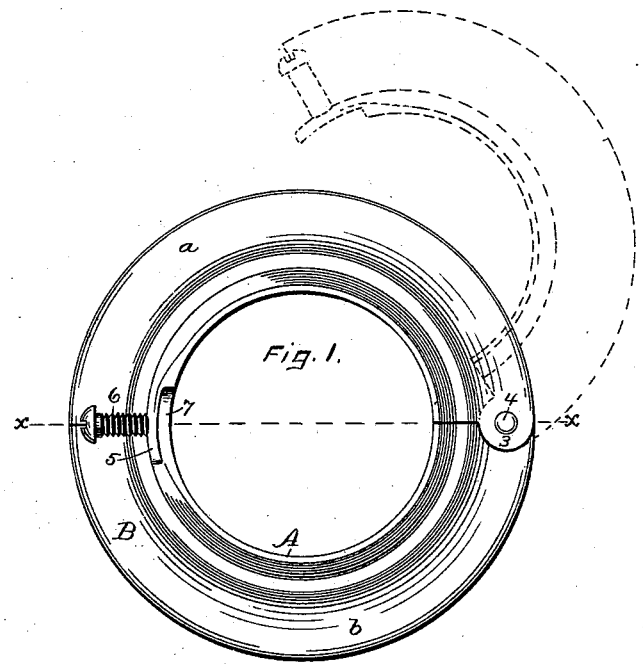
Figure 2:
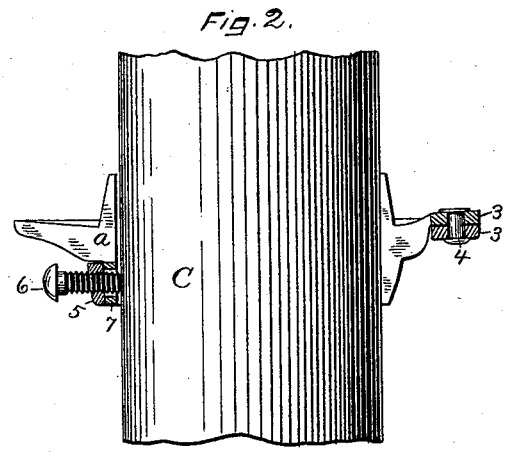

In the accompanying drawings, Figure 1 is a plan view of my floor and ceiling plate, and Fig. 2 is a sectional view thereof on the line $x$ $x$ of Fig. 1, the set-screw and pintle being shown in elevation, also a portion of pipe to which the plate is applied.

The general form of my plate is substantially the same as in the ordinary floor and ceiling plate, and constitutes substantially a central hub or collar A and a horizontally-projecting flange B, the whole surrounding the pipe and forming a finish at the floor, ceiling, or other surface through which the pipe extends. I form this plate of two parts $a$ $b$, made in segments of substantially half a circle each, and provided on one side with hinge lugs or knuckles 3, with which to hinge or pivot the parts together by means of the pintle 4, whereby the parts may be opened and closed for the application to the pipe C after the pipe is in position, thereby avoiding the necessity of passing the pipe through the plate or slipping the plate upon the pipe before placing the pipe in position or connecting it with other pieces. Each of the parts $a$ and $b$, at a point below the flange B, is provided with another pair of lugs extending in a circumferential direction, and together forming a part of the central hub or collar A, the lug 5 on the part $a$ being perforated and threaded to receive the set-screw 6. The companion lug 7 on the part $b$ is made to overlap the lug 5, as shown in Fig. 1, and is provided with a hole through which the end of the set-screw 6 may pass, as shown in Fig. 2, said holes and screw being arranged diametrically.

In order to apply the plate to a pipe, it is only necessary to unscrew the diametric set-screw 6, so that its ends will clear the lug 7 and permit the parts $a b$ to be swung open, as indicated by the broken lines in Fig. 1, slipped upon the pipe and brought together again, after which the set-screw is turned in so as to project through the hole in the lug 7 and bear upon the side of the pipe to hold the plate thereon at any desired point.

I am aware that prior patents show steam-pipe plates and stove-pipe thimbles consisting of two parts hinged together and fastening devices, and I hereby disclaim the same.

I claim as my invention—

As a new article of manufacture, the herein-described floor and ceiling plate, consisting of the hub or collar A for fitting the pipe and the horizontally-projecting flange for resting against the ceiling or floor, the same being divided into the two parts $a$ $b$, hinged together, as at 4, the lower end of said collar at a point underneath the flange B being divided in the form of overlapping circumferential lugs 5 7, and provided with a diametrical set-screw 6, all substantially as described, and for the purpose specified.

ALLAN J. BEATON.

Witnesses:
JAMES SHEPARD,
JOHN EDWARDS, Jr.